(12) United States Patent
Coupe et al.

(10) Patent No.: US 8,505,588 B2
(45) Date of Patent: Aug. 13, 2013

(54) PRODUCTION OF A FIBROUS STRUCTURE WITH VARIABLE THICKNESS BY 3D WEAVING

(75) Inventors: Dominique Coupe, Le Haillan (FR); Eric Bouillon, Le Haillan (FR); Bruno Dambrine, Le Chatelet en Brie (FR)

(73) Assignee: SNECMA Propulsion Solide, Le Haillan Cedex (FR)

( * ) Notice: Subject to any disclaimer, the term of this patent is extended or adjusted under 35 U.S.C. 154(b) by 105 days.

(21) Appl. No.: 13/131,305

(22) PCT Filed: Nov. 20, 2009

(86) PCT No.: PCT/FR2009/052236
§ 371 (c)(1),
(2), (4) Date: Aug. 3, 2011

(87) PCT Pub. No.: WO2010/061101
PCT Pub. Date: Jun. 3, 2010

(65) Prior Publication Data
US 2011/0277869 A1 Nov. 17, 2011

(30) Foreign Application Priority Data
Nov. 28, 2008 (FR) ...................................... 08 58102

(51) Int. Cl.
*D03D 11/00* (2006.01)
*D03D 41/00* (2006.01)

(52) U.S. Cl.
USPC ...................................... 139/11; 139/DIG. 1

(58) Field of Classification Search
USPC ............................................. 139/11, DIG. 1
See application file for complete search history.

(56) References Cited

U.S. PATENT DOCUMENTS

| | | | |
|---|---|---|---|
| 898,941 A | 9/1908 | Vogel | |
| 2,164,848 A | 7/1939 | Wallin | |
| 2,998,030 A * | 8/1961 | Koppelman et al. | 139/387 R |
| 3,749,138 A * | 7/1973 | Rheaume et al. | 139/408 |
| 4,055,697 A * | 10/1977 | Schmanski | 428/113 |
| 4,510,198 A * | 4/1985 | Rheaume | 442/206 |
| 4,922,968 A * | 5/1990 | Bottger et al. | 139/384 R |

(Continued)

FOREIGN PATENT DOCUMENTS

| | | |
|---|---|---|
| EP | 0 391 745 | 10/1990 |
| WO | WO 2006/136755 | 12/2006 |

OTHER PUBLICATIONS

International Search Report as issued for PCT/FR2009/052239.

*Primary Examiner* — Bobby Muromoto, Jr.
(74) *Attorney, Agent, or Firm* — Pillsbury Winthrop Shaw Pittman, LLP

(57) ABSTRACT

A method of making a fiber structure by multilayer three-dimensional weaving, the fiber structure having a thickness in a direction perpendicular to the warp and weft directions that varies along the warp direction while conserving the same number of warp yarns that are woven at all points of the fiber structure along the warp direction, wherein during a transition in the warp direction from a first portion of the fiber texture to a second portion of the fiber texture having a thickness that is greater than the thickness of the first portion, the number of warp planes is decreased and the number of layers of warp yarns is increased without changing the number of warp yarns, by constituting at least one warp plane in the second portion with warp yarns taken from at least two different warp planes in the first portion.

12 Claims, 15 Drawing Sheets

(56) References Cited

U.S. PATENT DOCUMENTS

| | | | |
|---|---|---|---|
| 4,922,969 A * | 5/1990 | Campman et al. | 139/408 |
| 4,958,663 A | 9/1990 | Miller et al. | |
| 5,085,252 A * | 2/1992 | Mohamed et al. | 139/22 |
| 5,102,725 A * | 4/1992 | Knox et al. | 442/205 |
| 5,104,726 A * | 4/1992 | Ross | 442/207 |
| 5,137,058 A * | 8/1992 | Anahara et al. | 139/384 R |
| 5,242,768 A * | 9/1993 | Nagatsuka et al. | 429/127 |
| 5,465,760 A * | 11/1995 | Mohamed et al. | 139/11 |
| 5,772,821 A * | 6/1998 | Yasui et al. | 156/93 |
| 5,783,279 A * | 7/1998 | Edgson et al. | 428/116 |
| 5,791,384 A * | 8/1998 | Evans | 139/383 R |
| 5,827,383 A * | 10/1998 | Campbell et al. | 156/73.1 |
| 5,899,241 A * | 5/1999 | David et al. | 139/408 |
| 6,003,564 A * | 12/1999 | Cahuzac et al. | 139/97 |
| 6,283,168 B1 * | 9/2001 | Gu et al. | 139/384 R |
| 6,446,675 B1 * | 9/2002 | Goering | 139/11 |
| 6,712,099 B2 * | 3/2004 | Schmidt et al. | 139/383 R |
| 6,874,543 B2 * | 4/2005 | Schmidt et al. | 139/383 R |
| 7,077,167 B2 * | 7/2006 | Nayfeh et al. | 139/11 |
| 7,101,154 B2 * | 9/2006 | Dambrine et al. | 416/230 |
| 7,168,453 B2 * | 1/2007 | Chon et al. | 139/11 |
| 7,200,912 B2 * | 4/2007 | Bouillon et al. | 29/432 |
| 7,241,112 B2 * | 7/2007 | Dambrine et al. | 415/230 |
| 7,413,999 B2 * | 8/2008 | Goering | 442/181 |
| 7,655,581 B2 * | 2/2010 | Goering | 442/205 |
| 7,712,488 B2 * | 5/2010 | Goering et al. | 139/384 R |
| 7,713,893 B2 * | 5/2010 | Goering | 442/246 |
| 7,943,535 B2 * | 5/2011 | Goering et al. | 442/205 |
| 7,960,298 B2 * | 6/2011 | Goering | 442/205 |
| 8,061,391 B2 * | 11/2011 | Dunleavy | 139/384 R |
| 8,079,387 B2 * | 12/2011 | Goering et al. | 139/11 |
| 8,127,802 B2 * | 3/2012 | Ouellette et al. | 139/11 |
| 8,153,539 B2 * | 4/2012 | Coupe et al. | 442/207 |
| 8,256,470 B2 * | 9/2012 | Shahkarami | 139/423 |
| 8,263,504 B2 * | 9/2012 | Bouillon et al. | 442/205 |
| 8,286,668 B2 * | 10/2012 | Teng et al. | 139/11 |
| 8,322,971 B2 * | 12/2012 | Coupe et al. | 415/9 |
| 2002/0081925 A1 * | 6/2002 | Goering | 442/215 |
| 2002/0081926 A1 * | 6/2002 | Goering et al. | 442/218 |
| 2002/0090873 A1 * | 7/2002 | Moody | 442/268 |
| 2002/0192450 A1 * | 12/2002 | Schmidt et al. | 428/299.1 |
| 2003/0056847 A1 * | 3/2003 | Schmidt et al. | 139/383 R |
| 2003/0116267 A1 * | 6/2003 | Sheahen et al. | 156/293 |
| 2004/0175553 A1 * | 9/2004 | Bouillon et al. | 428/223 |
| 2005/0084377 A1 * | 4/2005 | Dambrine et al. | 416/223 R |
| 2006/0121809 A1 * | 6/2006 | Goering | 442/246 |
| 2006/0257260 A1 * | 11/2006 | Dambrine et al. | 416/230 |
| 2008/0009210 A1 * | 1/2008 | Goering | 442/181 |
| 2008/0206048 A1 * | 8/2008 | Coupe et al. | 415/200 |
| 2008/0261474 A1 * | 10/2008 | Goering | 442/195 |
| 2009/0163100 A1 * | 6/2009 | Goering | 442/205 |
| 2009/0186547 A1 * | 7/2009 | Coupe et al. | 442/205 |
| 2009/0247034 A1 * | 10/2009 | Goering et al. | 442/206 |
| 2009/0280707 A1 * | 11/2009 | Bouillon et al. | 442/179 |
| 2009/0311462 A1 * | 12/2009 | Goering | 428/99 |
| 2009/0325443 A1 * | 12/2009 | Blackden et al. | 442/203 |
| 2010/0105268 A1 * | 4/2010 | Ouellette et al. | 442/203 |
| 2010/0105269 A1 * | 4/2010 | Goering et al. | 442/205 |
| 2010/0144227 A1 * | 6/2010 | Coupe et al. | 442/207 |
| 2011/0014403 A1 * | 1/2011 | Wang et al. | 428/34.1 |
| 2011/0121109 A1 * | 5/2011 | Charleux et al. | 239/601 |
| 2011/0277869 A1 * | 11/2011 | Coupe et al. | 139/11 |
| 2012/0258641 A1 * | 10/2012 | Bouillon et al. | 442/205 |
| 2012/0301691 A1 * | 11/2012 | Charleux et al. | 428/213 |

* cited by examiner

PRODUCTION OF A FIBROUS STRUCTURE WITH VARIABLE THICKNESS BY 3D WEAVING

CROSS REFERENCE TO RELATED APPLICATIONS

This application is the U.S. National Stage of PCT/FR2009/052236, filed Nov. 20, 2009, which in turn claims priority to French Application No. 0858102, filed Nov. 28, 2008. The contents of both applications are incorporated herein by reference in their entirety.

BACKGROUND OF THE INVENTION

The invention relates to making a fiber structure of varying thickness by three-dimensional (3D) weaving.

The term "3D" weaving is used herein to mean multilayer weaving using a plurality of layers of weft yarns and a plurality of layers of warp yarns, with warp yarns connecting together weft yarns of different layers. Various types of 3D weaves may be used, for example interlock, multi-satin, multi-plain, or multi-twill weaves may be used. Reference may be made in particular to document WO 2006/136755, the content of which is incorporated herein by reference.

A field of application of the invention is making 3D woven structures from which it is possible to obtain fiber preforms for making parts out of composite material.

A conventional process for making a composite material part comprises forming a fiber preform that is to constitute the fiber reinforcement of the part and that has a shape close to the shape of the part, and then densifying the fiber preform with a matrix. The matrix may be a resin, or in a so-called "thermostructural" composite material, it may be a refractory material such as carbon or ceramic.

In well-known manner, a resin matrix may be obtained by resin transfer molding (RTM), while a carbon or a ceramic matrix may be obtained using a liquid technique (impregnating with a carbon or ceramic precursor resin and transforming the precursor by pyrolysis), or by a gas technique (chemical vapor infiltration (CVI)).

Among the various techniques known for making fiber structures that are intended for constituting fiber preforms for composite material parts, possibly after being shaped, 3D weaving is advantageous in that it makes it possible in a single operation to obtain a thick multilayer fiber structure that presents good cohesion.

Nevertheless, a difficulty arises when the preform that is to be made has a shape that is particularly difficult or even impossible to obtain directly by conventional 3D weaving, in particular when it needs to present a large variation in thickness in a direction that is perpendicular to the warp direction and to the weft direction.

One solution consists in making a 3D woven fiber structure that presents the maximum thickness of the preform, and in obtaining the preform by cutting the preform out from the fiber structure. Nevertheless, in addition to the amount of scrap material that that involves, such a solution presents the drawback of it being necessary to cut the yarns, thereby running the risk of reducing the mechanical strength of the preform.

Another solution consists in locally increasing the size (and thus the cross-section) and/or the structure of the weft or warp yarns so as to reduce capability for reducing thickness when shaping the 3D fiber structure by compression. Nevertheless, the effect of that solution can be only limited. In particular, the size of the yarns cannot be increased beyond a limit beyond which weaving becomes very difficult or even impossible.

OBJECT AND SUMMARY OF THE INVENTION

The invention seeks to propose a method of making a 3D fiber structure of varying thickness that does not present the above-mentioned drawbacks.

In a first implementation of the invention, this object is achieved by a method of making a fiber structure by multilayer three-dimensional weaving, the fiber structure having a thickness in a direction perpendicular to the warp and weft directions that varies along the warp direction while conserving the same number of warp yarns that are woven at all points of the fiber structure along the warp direction, in which method, in a first aspect, during a transition in the warp direction from a first portion of the fiber texture to a second portion of the fiber texture having a thickness that is greater than the thickness of the first portion, the number of warp planes is decreased and the number of layers of warp yarns is increased without changing the number of warp yarns, by constituting at least one warp plane in the second portion with warp yarns taken from at least two different warp planes in the first portion.

In similar manner, in a second aspect of this first implementation, during a transition in the warp direction from a second portion of the fiber texture to a first portion of the fiber texture having a thickness that is smaller than the thickness of the second portion, the number of warp planes is increased and the number of layers of warp yarns is decreased without changing the number of warp yarns, by sharing the warp yarns of at least one warp plane of the second portion between different warp planes of the first portion.

Thus, the invention is remarkable in that by grouping together warp planes in full or in part or by splitting warp planes in full or in part it is possible to increase or decrease thickness by adding or removing layers of warp yarns without changing the number of warp yarns that are woven all along the length thereof. In the thicker second portion, it then suffices to add weft yarns.

Advantageously, in order to attenuate the effect on the density of the fiber structure as a result of varying the number of warp planes, it is possible, while weaving the second portion, to use weft yarns including at least some that present a size and/or a structure that is/are greater than the size and/or structure of the weft yarns used for weaving in the first portion. It is then possible to make a transition between said two portions of the fiber structure while causing the overall size of the weft yarns to vary progressively in successive weft planes.

In an implementation, a warp plane of the second portion contains all of the warp yarns of two adjacent warp planes of the first portion.

In another implementation, two adjacent warp planes of the second portion comprise the warp yarns of three adjacent warp planes of the first portion.

The invention also makes it possible to handle thickness variation in the weft direction in a manner similar to that described above for variation in the warp direction.

Thus, in another implementation of the invention, there is provided a method of making a fiber structure by multilayer three-dimensional weaving, the fiber structure having a thickness in a direction perpendicular to the warp and weft directions that varies along the weft direction while conserving the same number of weft yarns that are woven at all points of the fiber structure along the weft direction, in which method, in a first aspect, during a transition in the weft direction from a first portion of the fiber texture to a second portion of the fiber texture having a thickness that is greater than the thickness of the first portion, the number of weft planes is decreased and the number of layers of weft yarns is increased without changing the number of weft yarns, by constituting at least one weft plane in the second portion with weft yarns taken from at least two different weft planes in the first portion.

In similar manner, in a second aspect of this second implementation, during a transition in the weft direction from a second portion of the fiber texture to a first portion of the fiber texture having a thickness that is smaller than the thickness of the second portion, the number of weft planes is increased and the number of layers of weft yarns is decreased without changing the number of weft yarns, by sharing the weft yarns of at least one weft plane of the second portion between different weft planes of the first portion.

In either aspect, for weaving in the second portion, warp yarns may be used, at least some of which present a size and/or a structure that is/are greater than the size and/or structure of the warp yarns used for weaving in the first portion. It is then possible to make a transition between said two portions of the fiber structure by causing the overall size of the warp yarns to vary progressively in successive warp planes.

In an implementation, a weft plane of the second portion contains all of the weft yarns of two adjacent weft planes of the first portion.

In another implementation, two adjacent weft planes of the second portion comprise the weft yarns of three adjacent weft planes of the first portion.

BRIEF DESCRIPTION OF THE DRAWINGS

The invention can be better understood on reading the following description given by way of non-limiting indication and made with reference to the accompanying drawings, in which.

DETAILED DESCRIPTION OF IMPLEMENTATIONS

Figure 1:
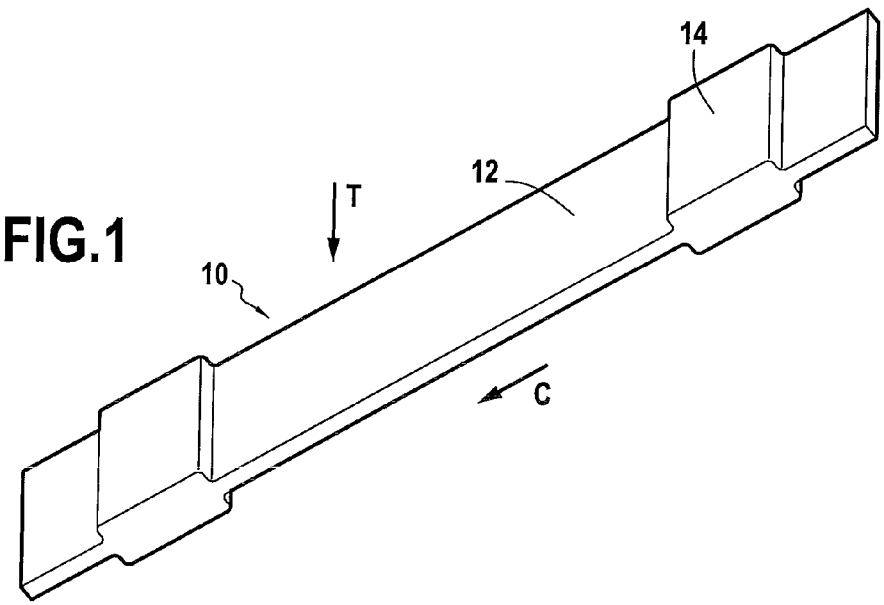
FIG. 1 is a highly diagrammatic view in perspective of a 3D woven fiber structure of varying thickness of the kind that can be made by a method of the invention.

FIG. 1 shows very diagrammatically a fiber structure 10 suitable for being obtained by 3D weaving using a method of the invention, with only the outer envelope of the fiber structure being shown.

The fiber structure 10 is woven in the form of a continuous strip in a warp direction C. The thickness of the fiber structure in a direction perpendicular to the warp direction C and the weft direction T is variable. Thus, the fiber structure has first portions 12 with a first thickness and second portions 14 with a second thickness greater than the first thickness.

By way of example, the fiber structure 10 may form a succession of fiber blanks that are cut out so that after being put into shape they constitute fiber preforms for blades that present a thicker root portion corresponding to a portion 14 and an airfoil portion corresponding to a portion 12. Naturally, the invention is applicable to 3D weaving of a fiber structure that presents varying thickness and regardless of its purpose.

Figure 2:
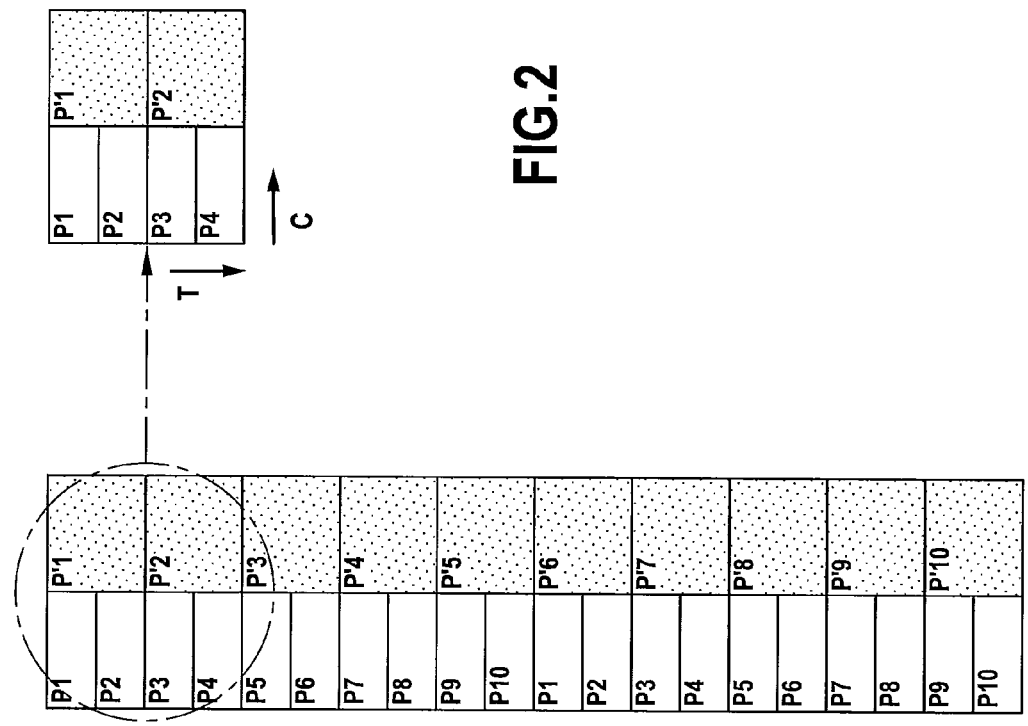
FIG. 2 shows very diagrammatically the correspondence between warp planes of a first portion of a fiber structure similar to that of FIG. 1 and warp planes of a second portion of the fiber structure of thickness greater than the thickness of the first portion, in a first implementation.

FIG. 2 is a schematic diagram showing how, by reducing the number of warp planes and correspondingly increasing the number of warp yarn layers, it is possible to go from a first portion 12 to a second portion 14 of the fiber structure in a first implementation.

In the example of FIG. 2, the number of warp planes in the portion 12 is equal to twenty, being made up of two like sets of ten planes P1 to P10 following one another in the weft direction, each of the planes P1 to P10 having the same number of warp yarn layers connecting together the weft yarns forming a given number of weft yarn layers.

The number of warp planes in the portion 14 is equal to ten, being made up of a set of planes P'1 to P'10. Each of the planes P'1 to P'10 is made up of the union of the warp yarns of two successive planes of the portion 12. Thus, the plane P'1 is formed by uniting the warp yarns of the planes P1 and P2 of the first set of planes P1 to P10, the plane P'2 is formed by uniting the warp yarns of the planes P3 and P4 of the first set of planes P1 to P10, and so on up to the plane P'10, which is formed by uniting the warp yarns of the planes P9 and P10 of the second set of planes P1 to P10. As a result, the number of warp planes is halved while the number of layers of warp yarns is doubled. Weaving then requires an increased number of layers of weft yarns.

FIGS. 3A to 3J show all of the successive warp planes in the transition zone between a portion 12 and a portion 14 of the fiber structure in a first example weave. Dashed lines represent warp yarn continuity between two planes in the portion 12 and one plane of the portion 14.

In the planes P1 to P10, the number of layers of warp yarns in this example is equal to four and the number of layers of weft yarns is equal to three (layers T1, T2, T3). The weave is of the satin type. Thus, in a plane P1, two-dimensional (2D) satin weaving is performed using warp yarns C1 and C4 in the outer weft layers T1 and T3, with the satin pitch being equal to 5 (1 weft yarn in 5 being "caught" by a warp yarn), whereas multi-satin weaving is performed by a warp yarn C2 connecting together the weft yarns of the layers T1 and T2 and a warp yarn C3 connecting together the weft yarns of the layers T2 and T3. The term "multi-satin" weaving is used to mean a weaving technique in which a warp yarn "catches" 1 yarn out of every n yarns of a layer of weft yarns in alternation with 1 yarn out of every n yarns of an adjacent layer of weft yarns, where n is an integer greater than or equal to 3. In the example shown, n is equal to 10, thereby giving a mean satin pitch equal to 5 (10÷2). In similar manner, in a plane P2, 2D satin weaving is performed with warp yarns C5 and C8 in the outer layers T1 and T3 and multi-satin weaving is performed by a warp yarn C6 connecting together the weft yarns of the layers T1 and T2 and a warp yarn C7 connecting together the weft yarns of the layers T2 and T3.

In the planes P'1 to P'10, the number of layers of warp yarns in this example is equal to eight, and the number of layers of weft yarns is equal to seven (layers T'1 to T'7). The weave is of the satin type. Thus, in the plane P'1 (FIG. 3A), 2D satin weaving is performed with the warp yarns C1 and C8 in the outer weft layers T'1 and T'7, whereas multi-satin weaving is performed by the warp yarns C5, C2, C6, C3, C7, and C4 connecting together the weft yarns respectively of the layers T'1 &T'2, T'2 & T'3, T'3 & T'4, T'4 & T'5, T'5 & T'6, and T'6 & T'7.

It should be observed that the 2D satin weaving in the outer weft layers serves to obtain surface appearance that is relatively smooth.

FIGS. 4A to 4J show all of the successive warp planes in the transition zone between a portion 12 and a portion 14 of the fiber structure using a second example weave.

The planes P1 to P10 are identical to the planes P1 to P10 of the example of FIGS. 3A to 3J, with the weaving being performed using the same satin type weave.

In contrast, in the planes P'1 to P'10, although the number of layers of warp yarns is still equal to eight, the number of layers of weft yarns is equal to nine (layers T'1 to T'9). In the plane P'1 (FIG. 4A) in the outer layers of weft yarns T'1 and T'9, the weaving is performed with the warp yarns C1 and C8 using a plain type weave but while offsetting the warp yarns C1, C8 to "catch" 1 yarn in 10 of the adjacent layer of weft yarns T'2, T'8 so as to connect together the layers T'1 and T'2 and the layers T'8 and T'9. In the remainder of the fiber texture, multi-satin weaving is performed using the warp yarns C5, C2, C6, C3, C7, and C4 connecting together the weft yarns respectively of the layers T'2 & T'3, T'3 & T'4, T'4 & T'5, T'5 & T'6, T'6 & T'7, and T'7 & T'8. The mean pitch of the multi-satin weaving is equal to 5 with each warp yarn "catching" 1 yarn in 10 of a layer of weft yarns in alternation with 1 yarn in 10 of an adjacent layer. The weaving pattern is similar in the following planes P'2 to P'10.

In comparison with satin type weaving in the outer layers of the fiber structure, weaving with a plain type weave gives easier access to the core of the preform made from the fiber structure for densification purposes, in the thicker portion(s) thereof. Furthermore, a plain type weave in the outer layers provides better strength in the warp and weft directions while the fiber structure is being manipulated and while it is being deformed in order to obtain a preform of the desired shape.

In the implementation of FIGS. 2, 3A to 3J, and 4A to 4J, an increase in thickness is obtained by halving the number of warp planes (and thus by doubling the number of layers of warp yarns).

Depending in particular on the amplitude of the increase in thickness that is to be obtained, it is possible to adopt a ratio between the number of warp planes in the thinner portion and the number of warp planes in the thicker portion that is other than ½ (with the ratio between the number of layers of warp yarns being the reciprocal thereof). In general, starting from N warp planes, each comprising k layers of warp yarns in the thinner portion (where N and k are integers), it is possible to form n warp planes, each comprising K layers of warp yarns (where n and K are integers such that $$N \times k = n \times K$$

with N>n).

Figure 5:
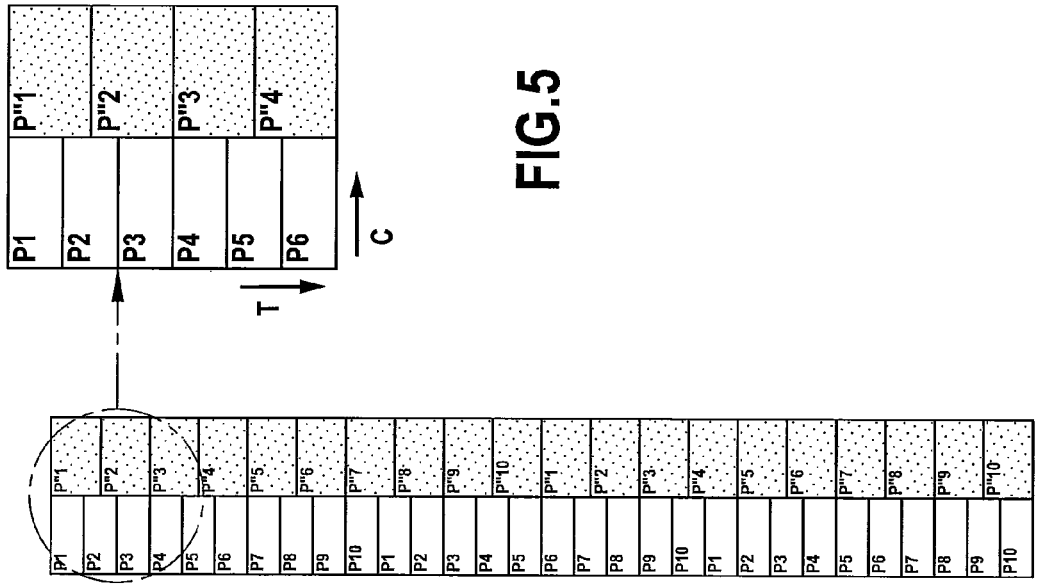
FIG. 5 shows very diagrammatically the correspondence between warp planes of a first portion of a fiber structure similar to that of FIG. 1 and warp planes of a second portion of the fiber structure of thickness greater than the thickness of the first portion, in a second implementation.

Thus, FIG. 5 is a schematic diagram showing how, starting from three warp planes in a first portion 12 of the fiber structure 10 it is possible to form two warp planes in a thicker, second portion 14 with a 50% increase in the number of layers of warp yarns.

In the example of FIG. 5, the number of warp planes in the portion 12 is equal to thirty, being made up of three like sets of ten planes P1 to P10 that follow one another in the weft direction, each of the planes P1 to P10 having the same number of layers of warp yarns connecting together weft yarns forming a given number of layers of weft yarns.

The number of warp planes in the portion 14 is equal to twenty, being constituted by two like sets of ten planes P"1 to P"10. Two consecutive planes in the sets P"1 to P"10 are formed by the warp yarns coming from three consecutive planes in the sets P1 to P10. Thus, a plane P"1 is formed by uniting warp yarns coming from consecutive planes P1, P2, and P3, and the consecutive plane P"2 is formed by uniting the remaining warp yarns of the planes P1, P2, and P3, and so on.

FIGS. 6A to 6J show an example of all of the successive warp planes in the transition zone between two portions 12 and 14 complying with the example of FIG. 5 for a weave that is similar to that of the example of FIGS. 4A to 4J.

The planes P1 to P10 are identical to the planes P1 to P10 of the example of FIGS. 3A to 3J, with four layers of warp yarns and a satin type weave.

In the planes P"1 to P"10, the number of layers of warp yarns is equal to six, while the number of layers of weft yarns is equal to seven (layers T"1 to T"7).

In the plane P"1, in the outer layers of weft yarns T"1 and T"7, the weaving is performed with the warp yarns C1 (coming from the plane P1) and C8 (coming from the plane P2) using a plain type weave, but while offsetting the warp yarns C1, C8 to "catch" 1 yarn in 10 of the adjacent layer of weft yarns T"2, T"6 so as to connect together the layers T"1 and T"2 and the layers T"6 and T"7. In the remainder of the plane P"1, the weave is of the multi-satin type having a mean pitch equal to 5 with the warp yarn C9 (coming from the plane P3) connecting together the weft yarns of the layers T"2 and T"3, the warp yarn C6 (coming from the plane P2) connecting together the weft yarns of the layers T"3 and T"4, the warp yarn C3 (coming from the plane P1) connecting together the weft yarns of the layers T"4 and T"5, and the warp yarn C11 (coming from the plane P1) connecting together the weft yarns of the layers T"5 and T"6.

In the plane P"2 adjacent to the plane P"1, in the outer layers of weft yarns T"1 and T"7, the weaving is performed using the warp yarn C5 (coming from the plane P2) and the warp yarn C12 (coming from the plane P3) in a plain type weave similar to that used in the outer layers T"1 and T"7 in the plane P"1. In the remainder of the plane P"2, the weave is of the multi-satin type as in the plane P"1 with the warp yarn C2 (coming from the plane P1) connecting together the weft yarns of the layers T"2 and T"3, the warp yarn C10 (coming from the plane P3) connecting together the weft yarns of the layers T"3 and T"4, the warp yarn C7 (coming from the plane P2) connecting together the weft yarns of the layers T"4 and T"5, and the warp yarn C4 (coming from the plane P1) connecting together the weft yarns of the layers T"5 and T"6

FIGS. 6B to 6J show the origins of the warp yarns and their paths for the planes P"3 to P"10 of the first set of planes P"1 to P"10 and for the planes P"1 to P"10 of the second set of planes P"1 to P"10.

By definition, in each portion of the fiber structure, a warp plane is formed by a set of warp yarns that extend over all of the layers of weft yarns in that portion.

Figure 3A:
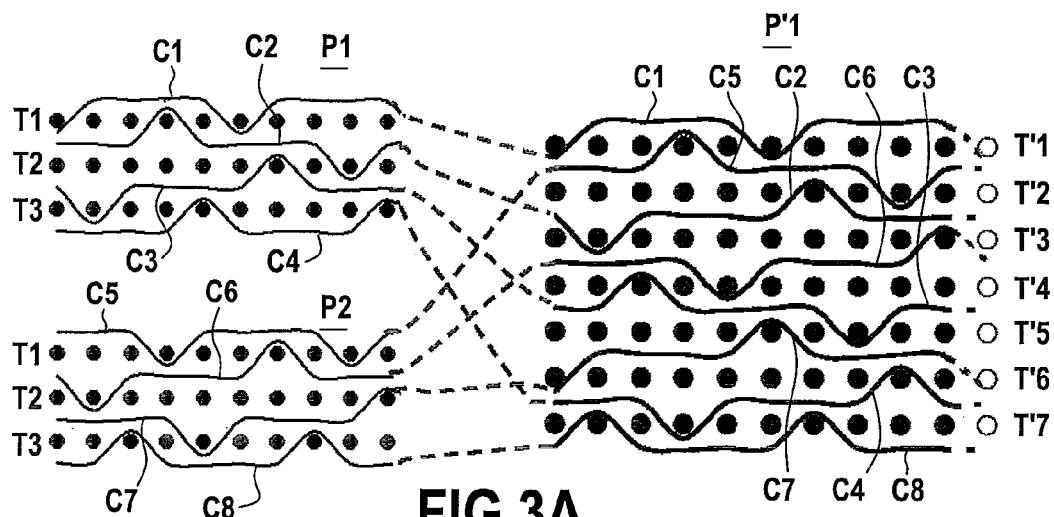
FIGS. 3A to 3J show various successive planes in a first example of a weave for a fiber structure in the implementation of FIG. 2.
Figure 3B:
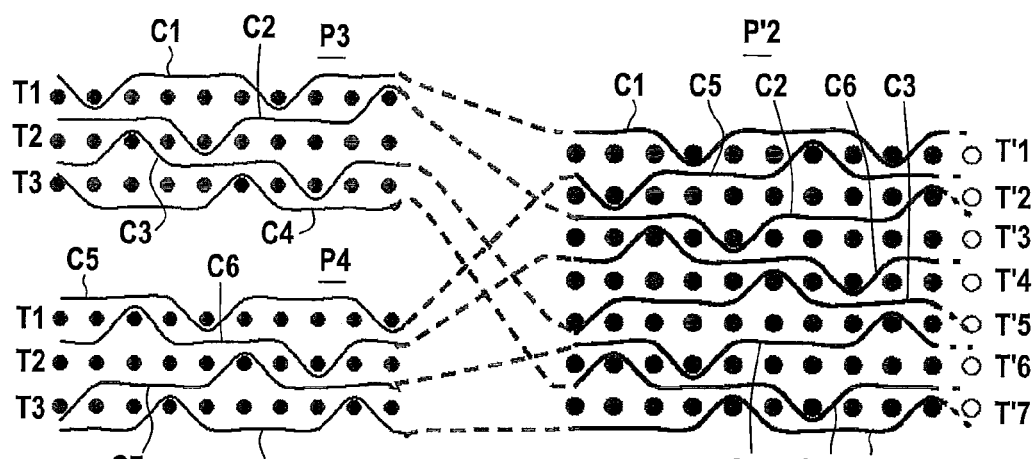
Figure 3C:
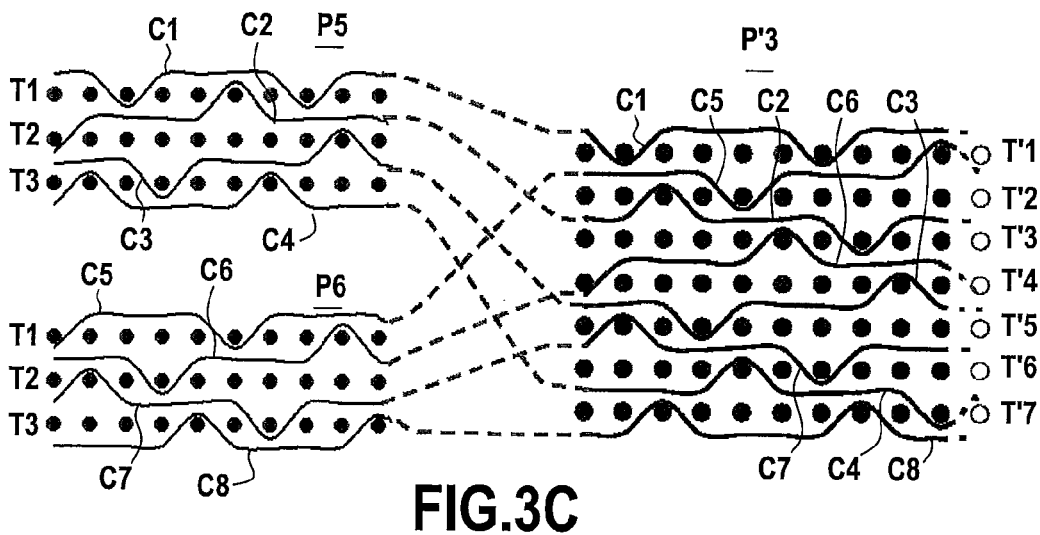
Figure 3D:
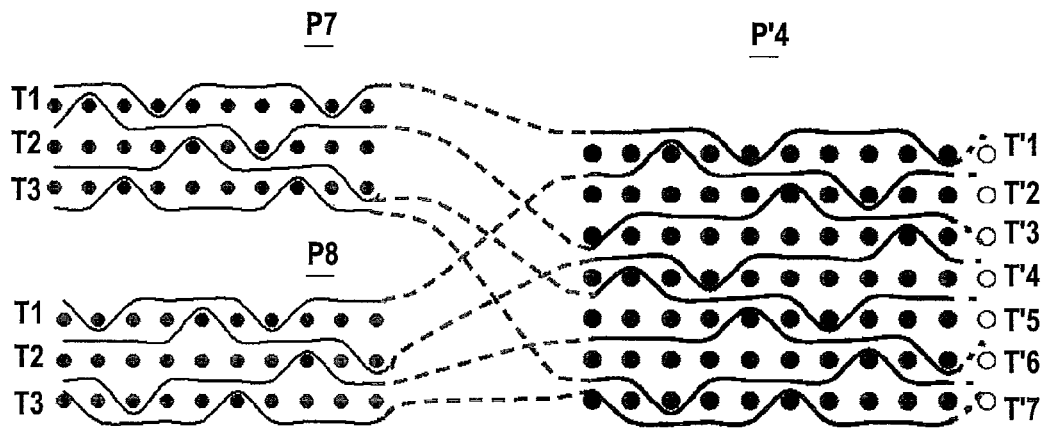
Figure 3E:
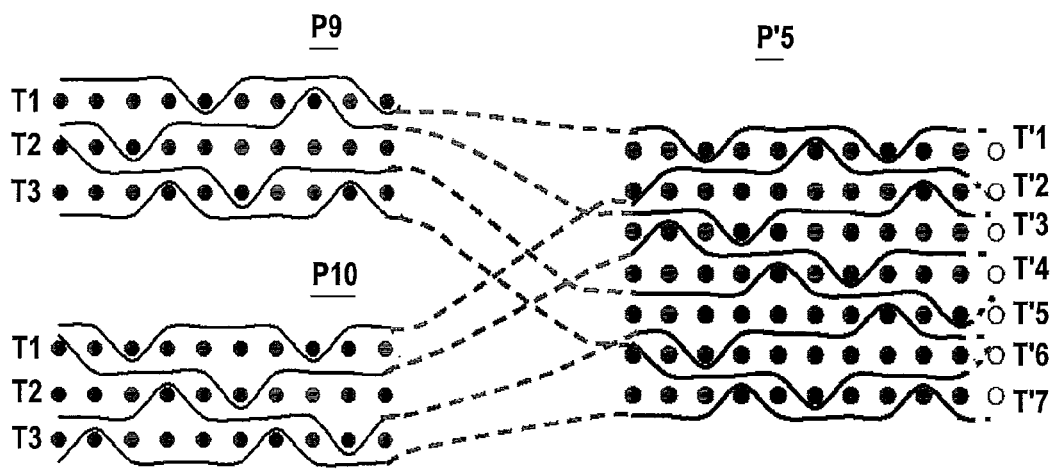
Figure 3F:
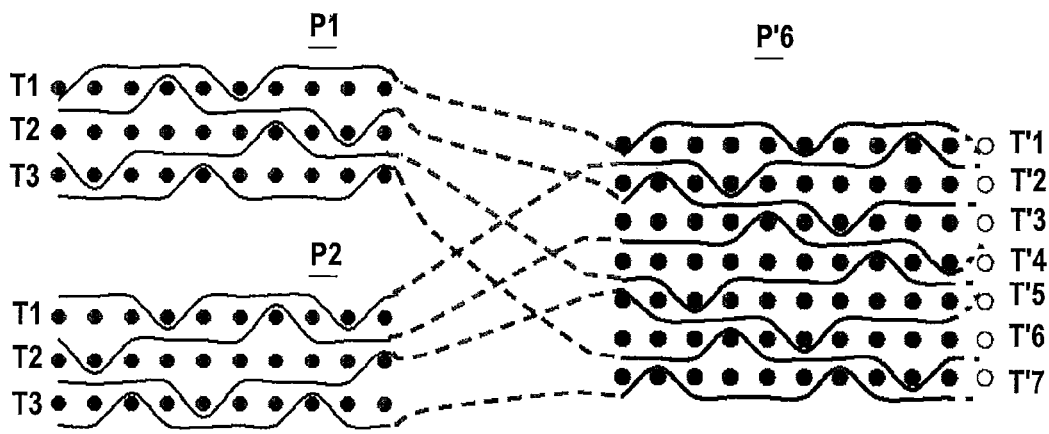
Figure 3G:
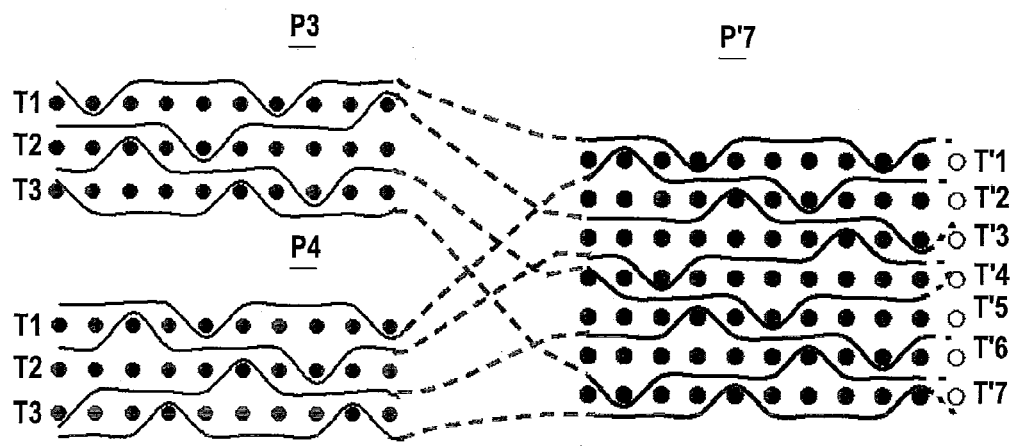
Figure 3H:
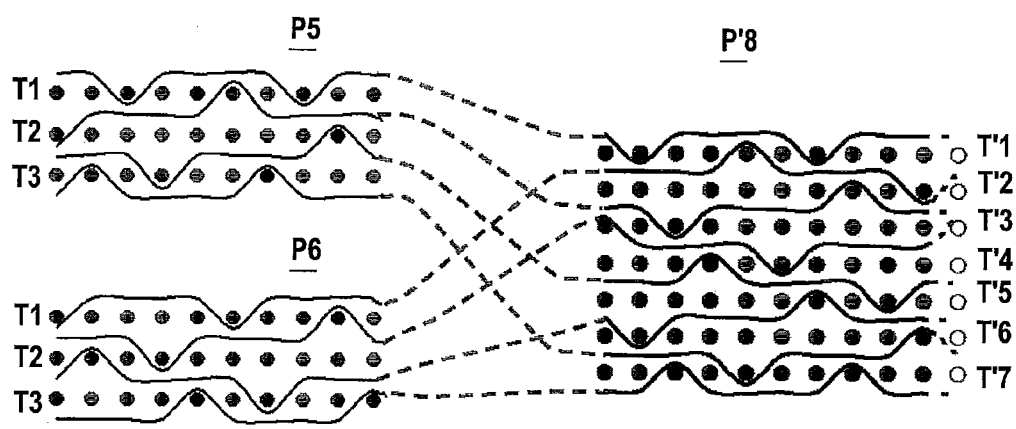
Figure 3I:
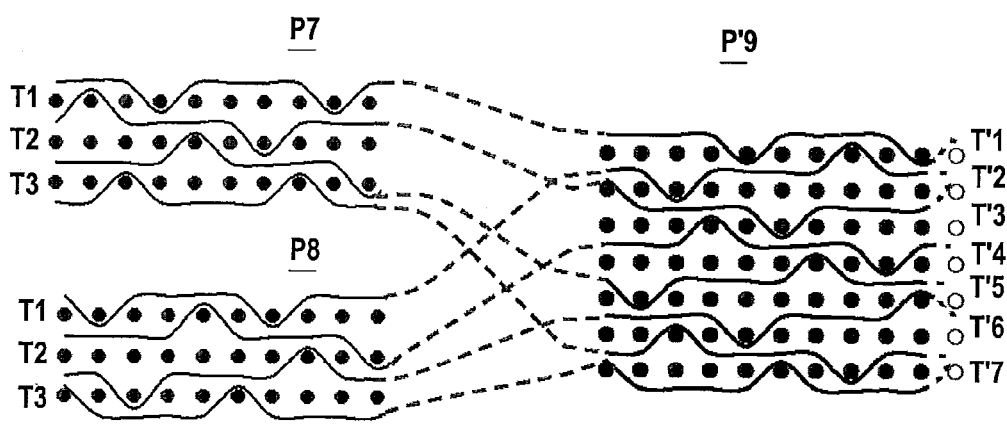
Figure 3J:
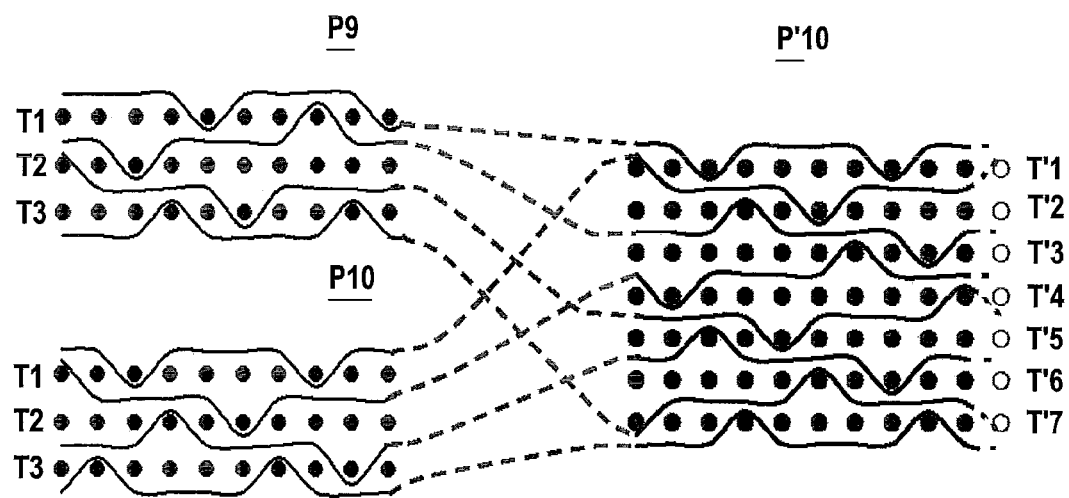
Figure 4A:
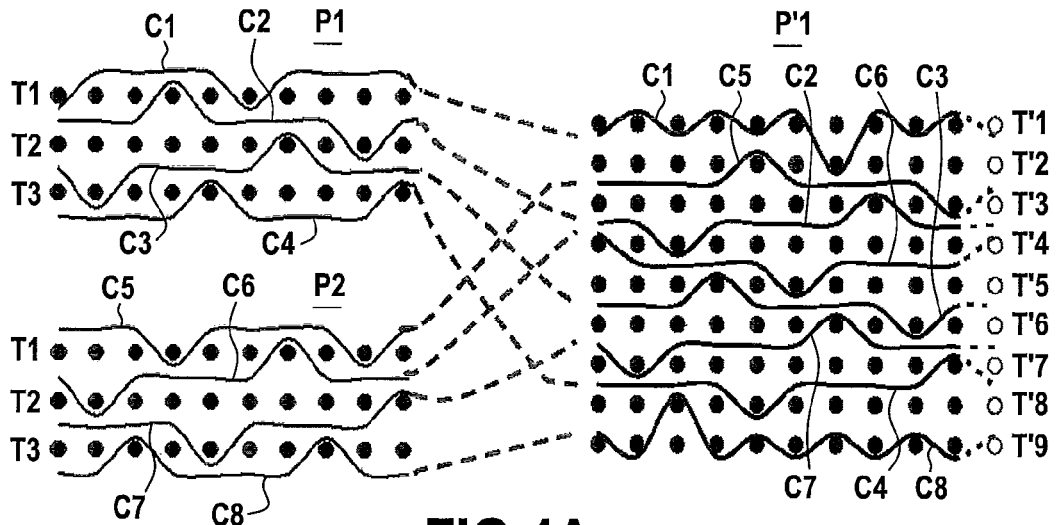
FIGS. 4A to 4J show various successive planes of a second example of a weave for a fiber structure in the implementation of FIG. 2.
Figure 4B:
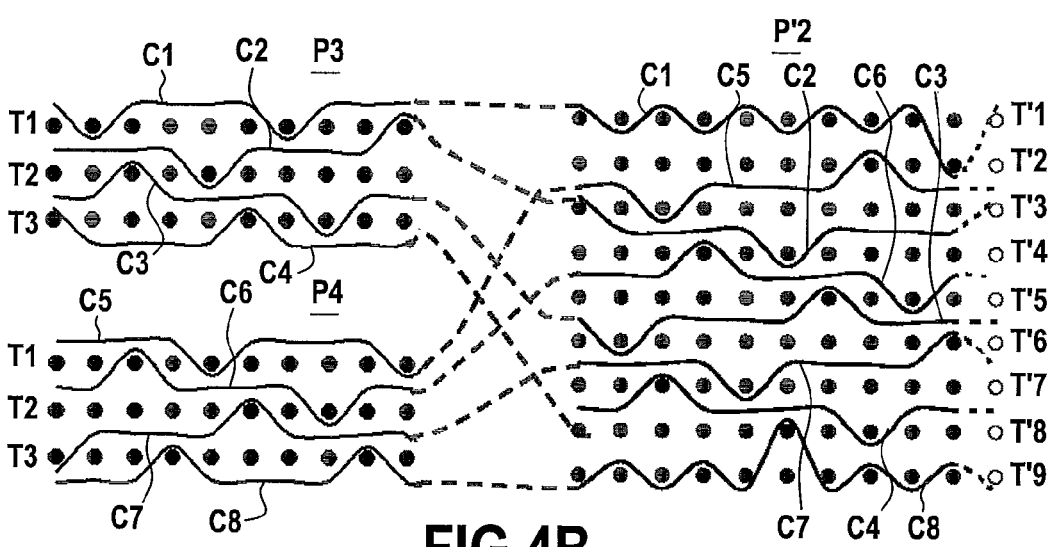
Figure 4C:
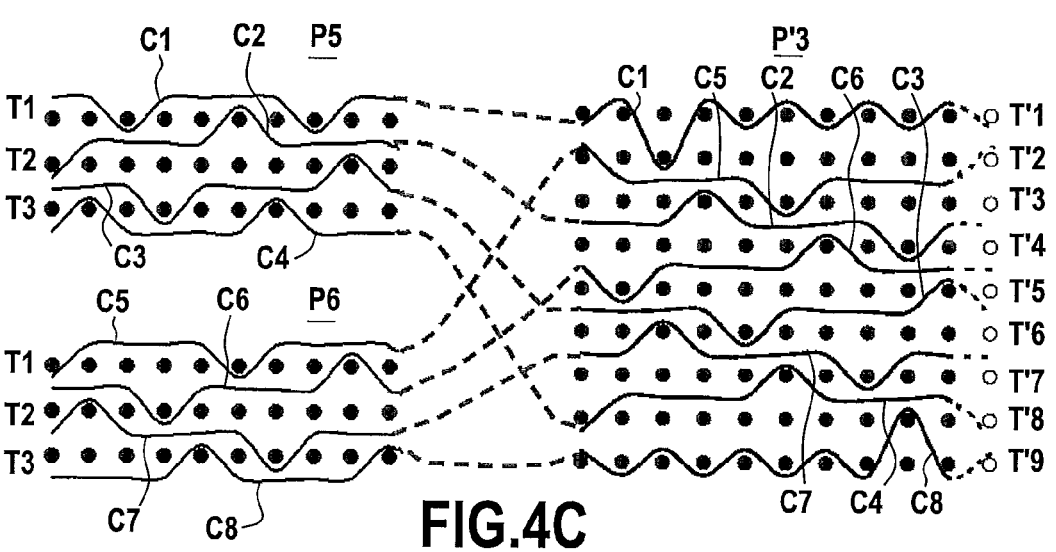
Figure 4D:
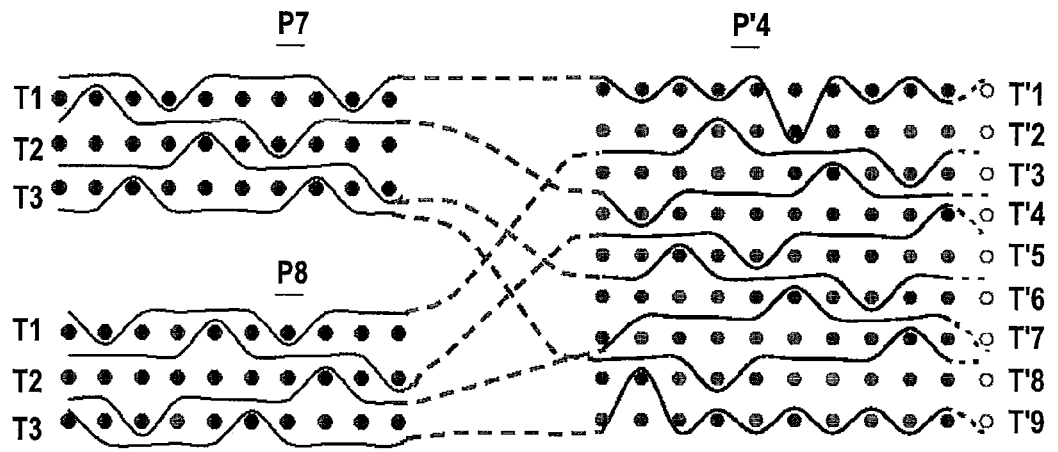
Figure 4E:
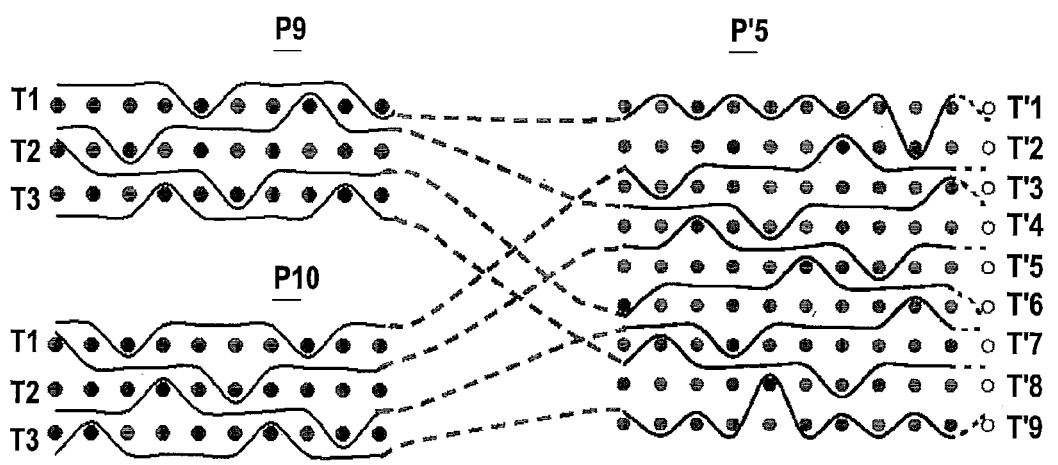
Figure 4F:
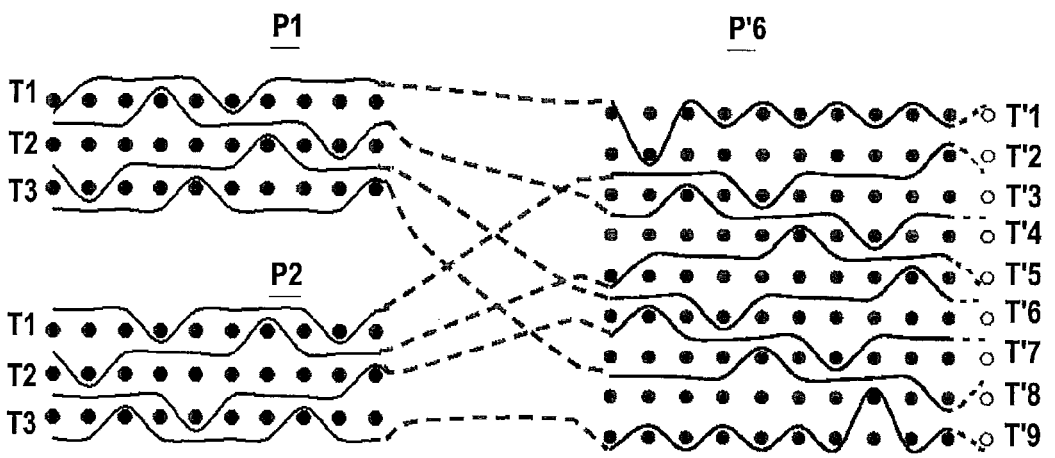
Figure 4G:
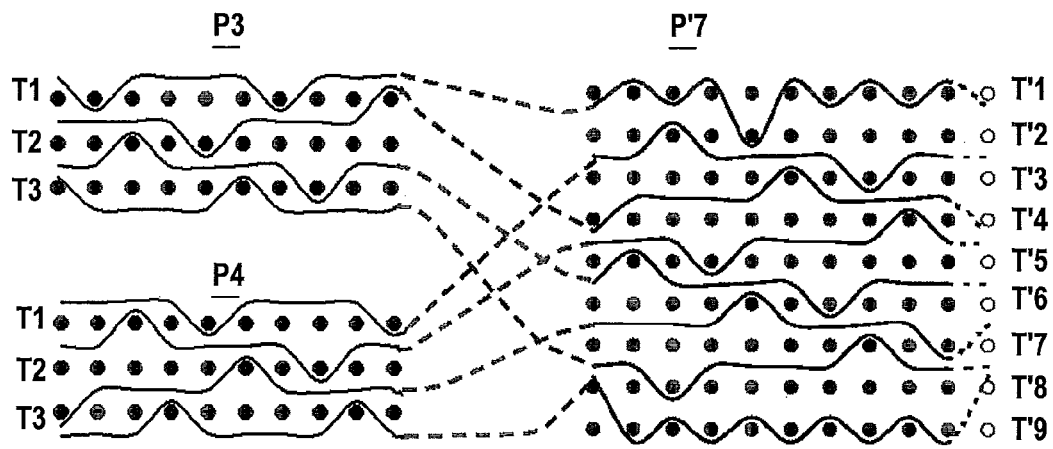
Figure 4H:
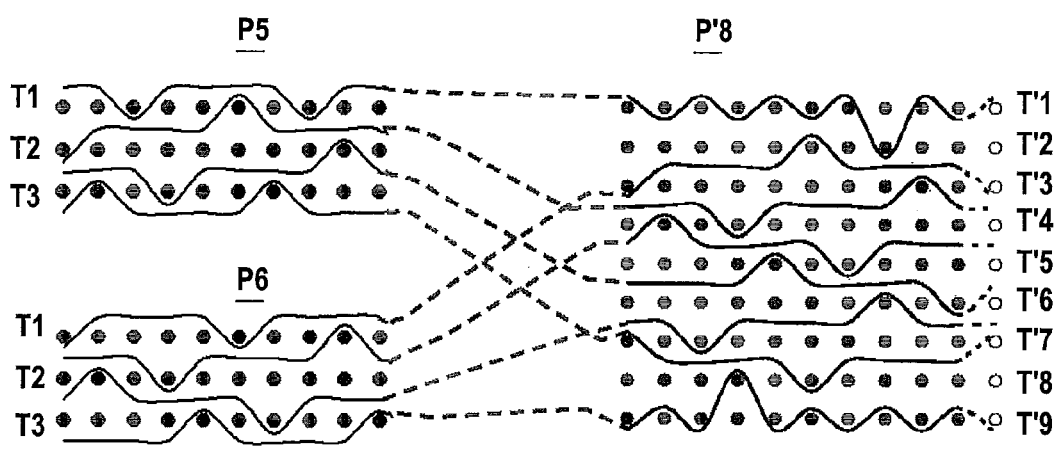
Figure 4I:
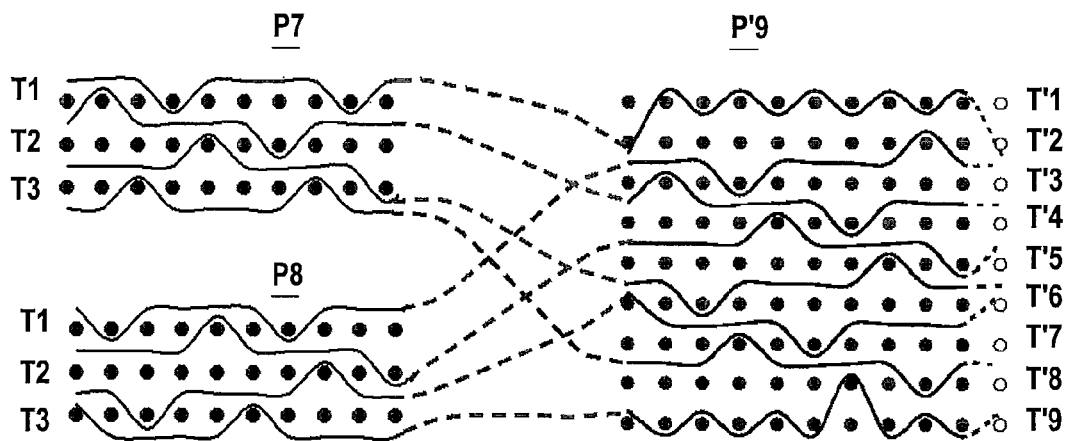
Figure 4J:
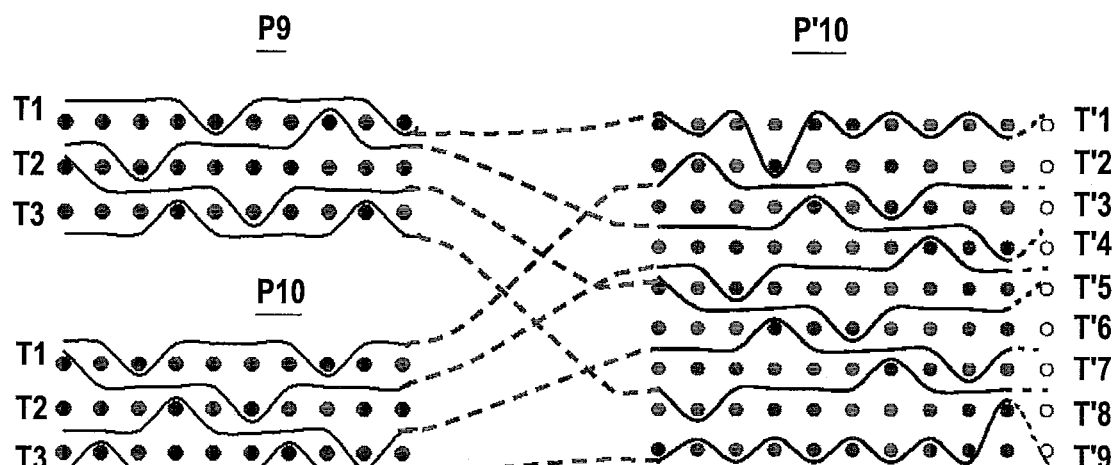
Figure 6A:
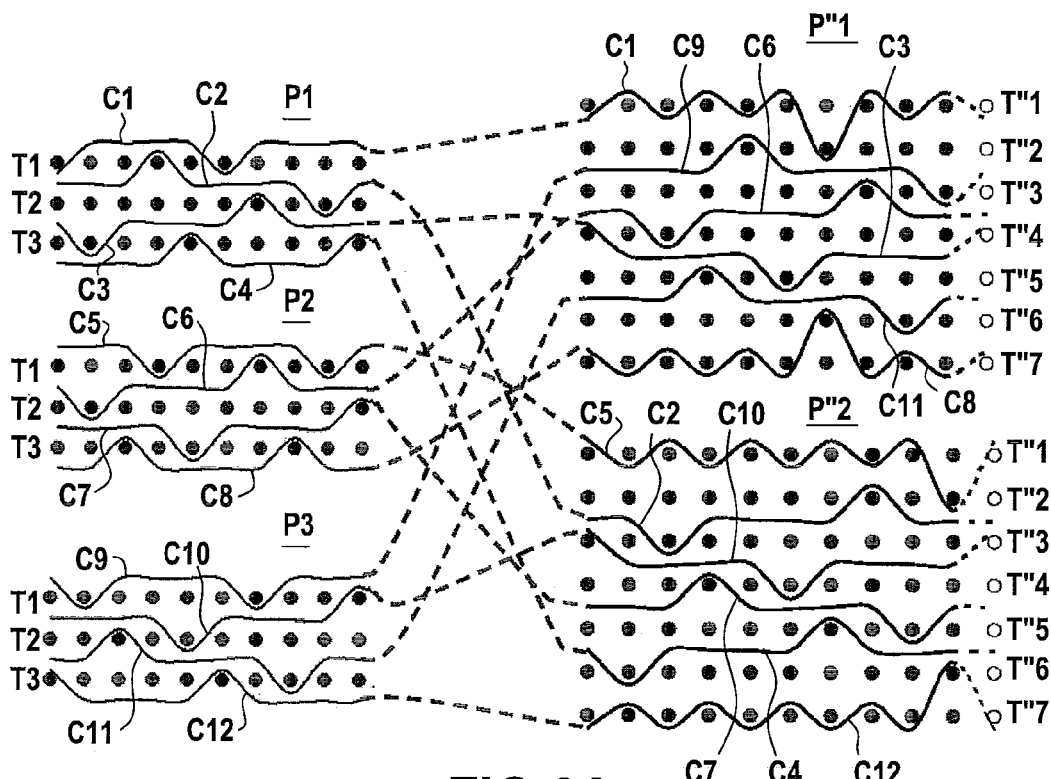
FIGS. 6A to 6J show various successive planes of an example weave of a fiber structure in the implementation of FIG. 5.
Figure 6B:
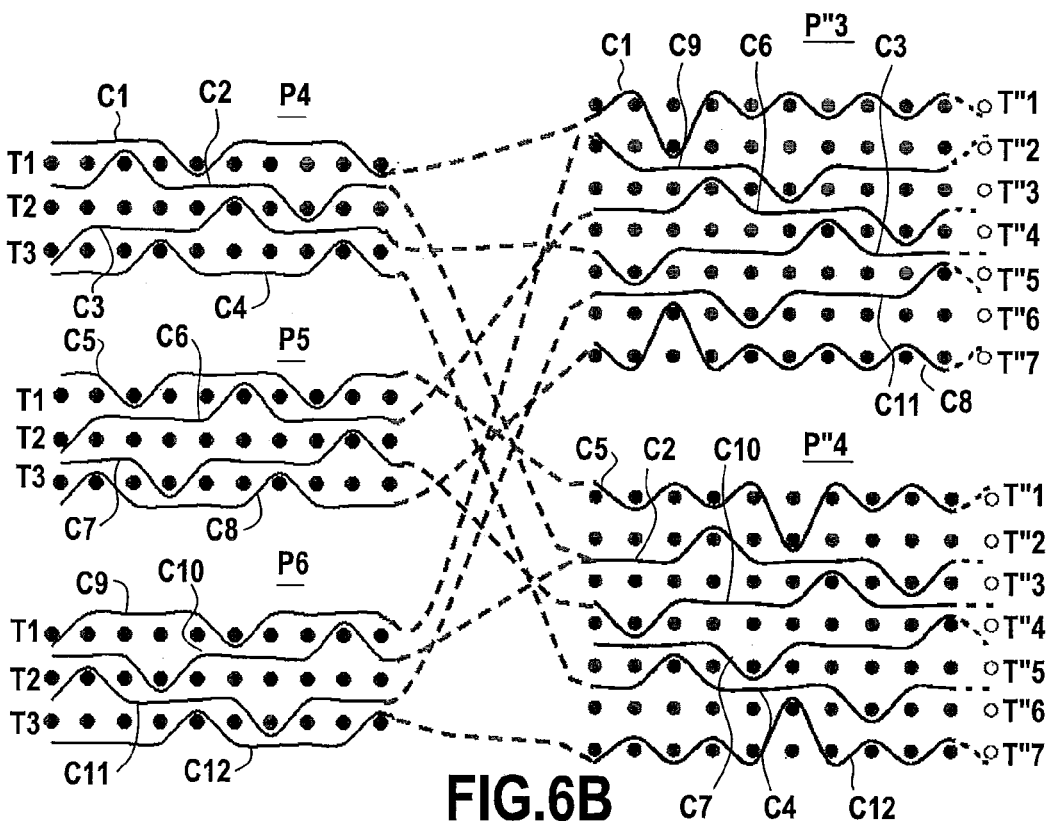
Figure 6C:
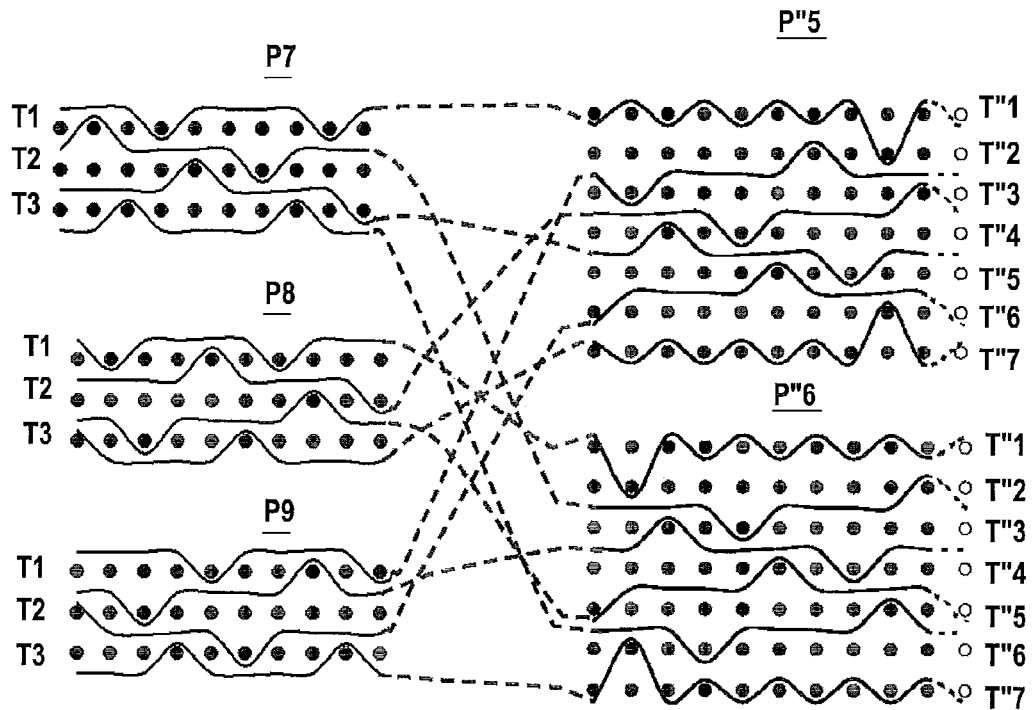
Figure 6D:
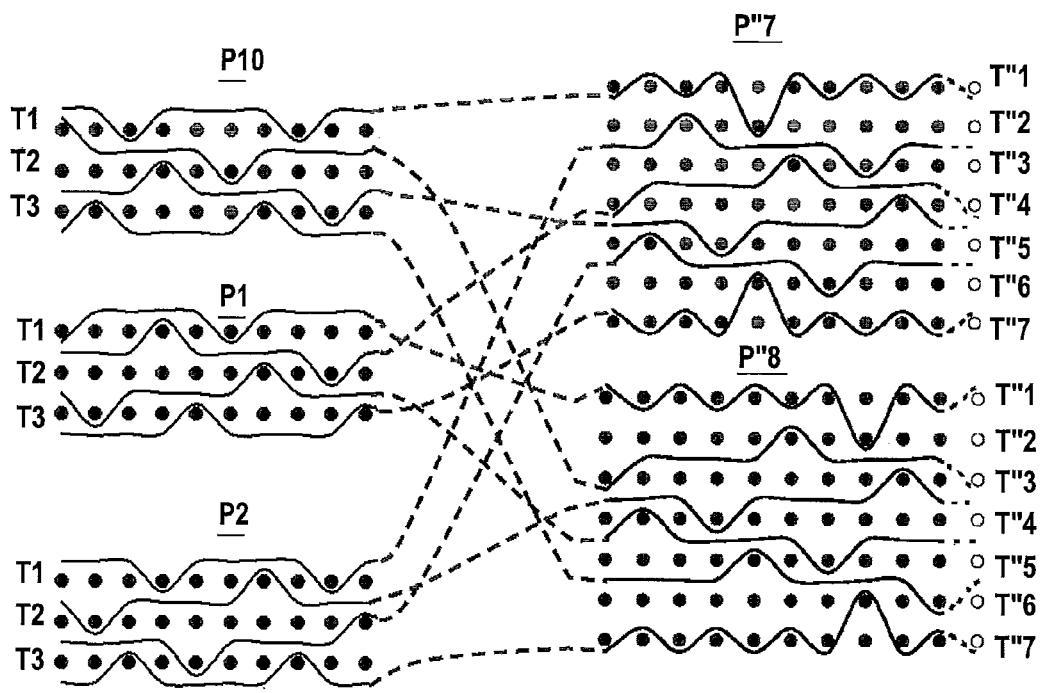
Figure 6E:
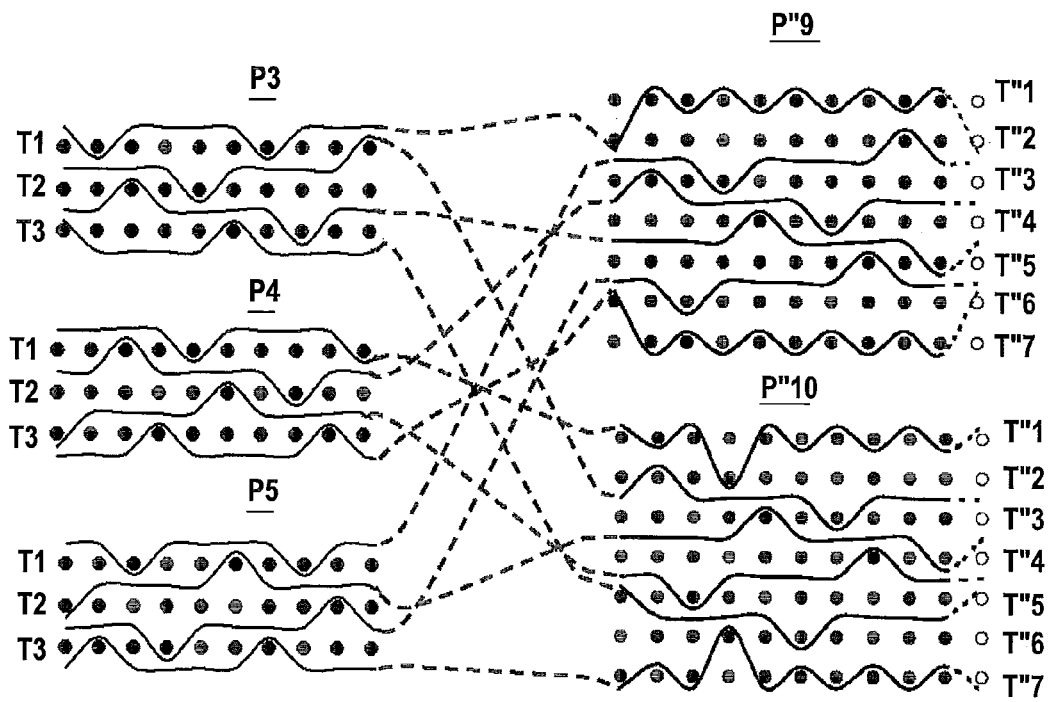
Figure 6F:
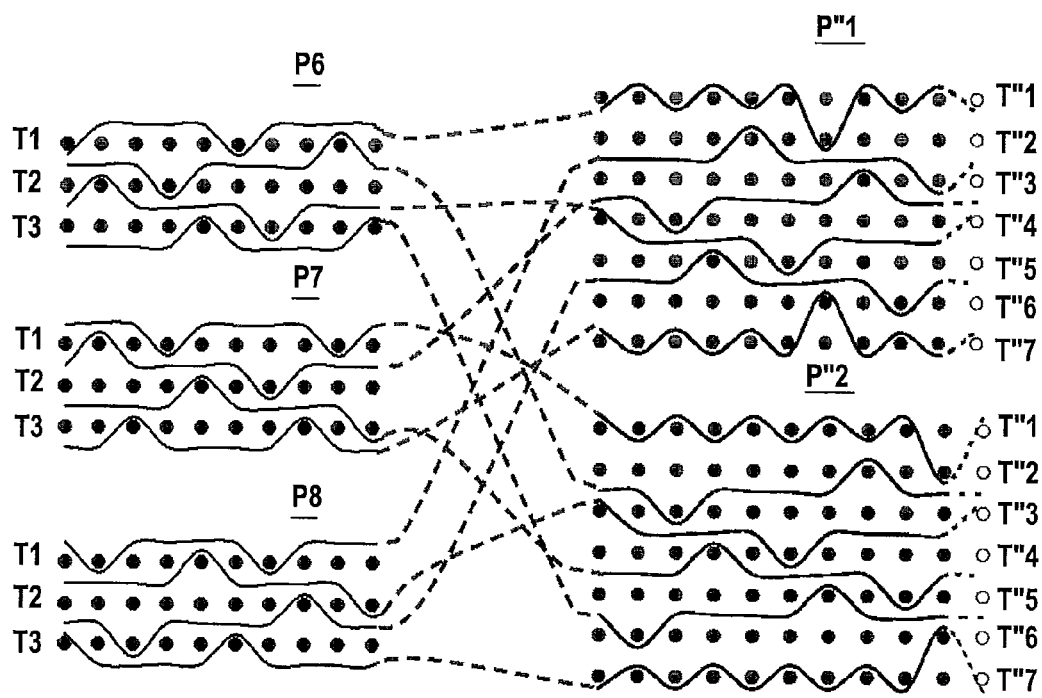
Figure 6G:
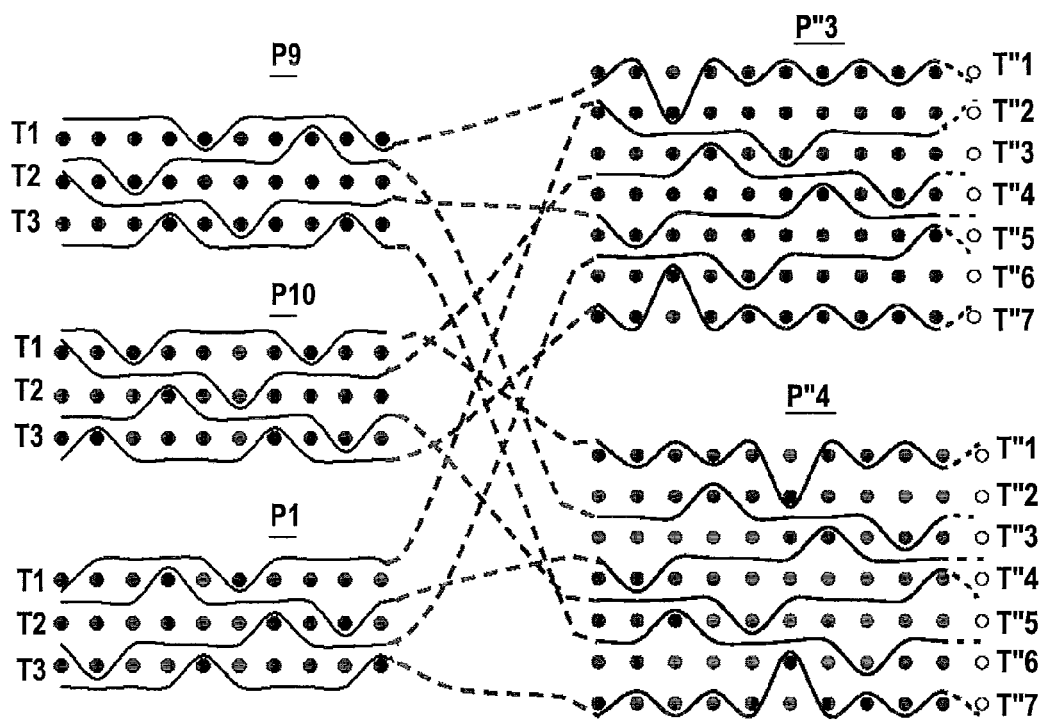
Figure 6H:
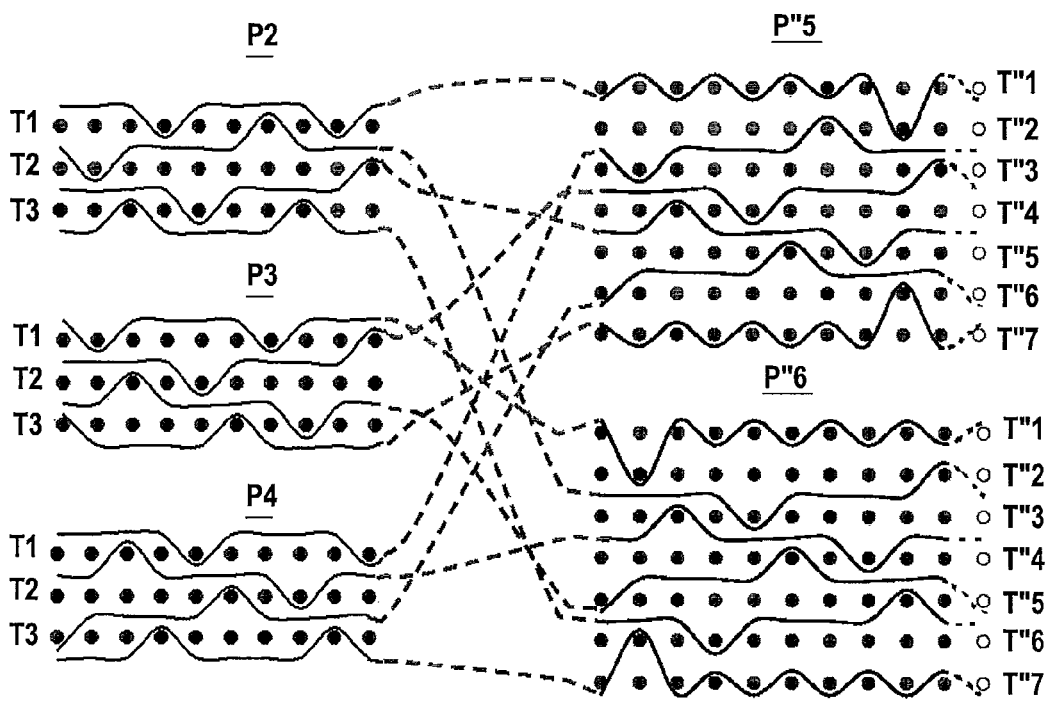
Figure 6I:
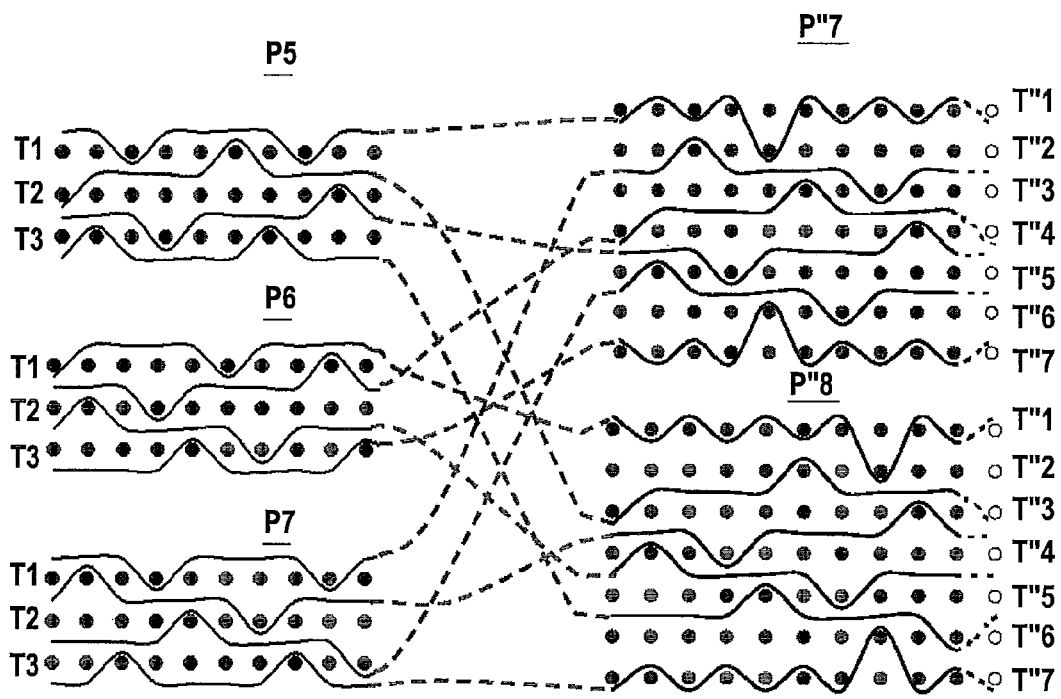
Figure 6J:
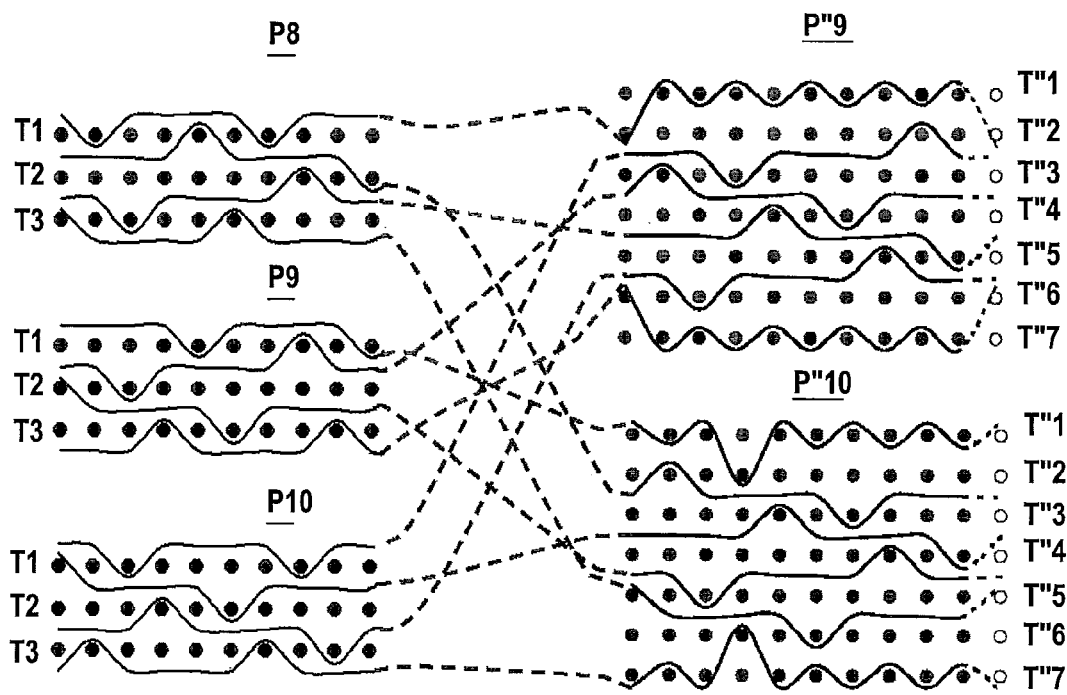

For reasons of convenience, in the left-hand portions of FIGS. 3A-3J, 4A-4J, and 6A-6J, the various warp planes, such as for example the planes P1, P2 in FIG. 3A, the planes P1, P2 in FIG. 4A, or the planes P1, P2, P3 in FIG. 6A, are shown as being one above the other, even though they are one behind another in the weft direction, each of these planes being formed by warp yarns that catch yarns of the same layers of weft yarns (e.g., in FIG. 3A, the warp yarns C1 to C4 of the plane P1 catch the weft yarns of the layers T1 to T3, and the warp yarns C5 to C8 of the plane P2 catch the weft yarns of the same layers T1 to T3).

Naturally, other multilayer weaves may be used such as multi-satin weaves with a mean pitch other than 5, multi-plain weaves that are not limited to the outer layers of weft yarns, multi-twill weaves, and weaves of the interlock type. In addition, for a given weave, various correspondences may be adopted between warp yarns of the warp planes of the first portion of the fiber structure and warp yarns of the warp planes of the thicker second portion.

In addition, passing from a thicker portion 14 of the fiber structure to a thinner portion 12 of the fiber structure is performed in the manner that is opposite from that described for passing from a portion 12 to a portion 14, i.e. by increasing the number of warp planes and correspondingly decreasing the number of warp yarns in the warp planes, the number of layers of weft yarns also being decreased. The warp yarns of a warp plane of the second portion are shared between different warp planes of the first portion.

The above-described weaving technique is particularly advantageous in that it enables a fiber structure to be made of thickness that varies along the warp direction while conserving the same number of warp yarns that are woven at all points along the warp direction, the number of layers of weft yarns being adapted to the number of layers of warp yarns. This enables the fiber structure of varying thickness to be obtained directly without it being necessary to perform any cutting. Naturally, along the fiber structure in the warp direction, it is possible to vary thickness through different amplitudes.

The reduction in the number of warp planes in the thicker portion 14 gives rise to a warp density in the portion 14 that is less than the warp density in the thinner portion 12. If weft yarns having the same size and structure are used in the portions 12 and 14, then the mean density of the fiber structure in a portion 14 is less than in a portion 12. The size of a yarn is expressed in terms of its weight per unit length or the number of similar elementary filaments from which it is made up. The weft structure is represented by the distance between successive weft planes in the warp direction.

In order to prevent such an overall variation in density along the fiber structure, it is possible to weave in a thicker portion 14 using weft yarns of size and/or weft structure that is/are greater than in a thinner portion 12, where a structure that is "greater" means a structure having a reduction in the distance between consecutive weft planes.

Figure 7:
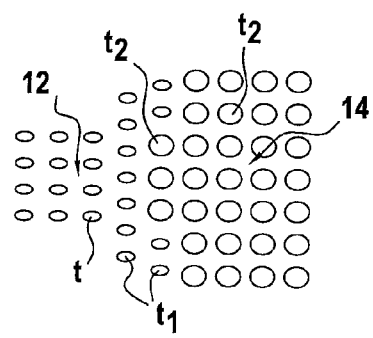
FIG. 7 shows a variant weft constitution enabling a progressive transition to be made between a first portion of a fiber structure and a second portion of greater thickness.

FIG. 7 shows the use of weft yarns of greater size in a portion 14 than in a portion 12, the greater size being represented by a cross-section that is larger. For greater clarity, only the weft yarns are shown (in section). Since the number of warp planes is halved between the portions 12 and 14, as in the example of FIG. 2, it is possible to use weft yarns in the portion 14 of a size that is twice that of the yarns used in the portion 12. The variation in weft size is the reciprocal of the variation in terms of number of warp planes if it is desired to obtain the best compensation for the variation in warp density. Nevertheless, it is possible to opt for compensation that is partial only.

FIG. 7 also shows the possibility of adopting a progressive variation in the size of the weft yarns in a transition zone between the portions 12 and 14, so that the overall size in consecutive weft planes increases progressively. In the example shown, corresponding to the example of FIGS. 3A to 3J, in the transition zone between the portions 12 and 14, the first weft plane of the portion 14 is made up of seven layers of weft yarns $t_1$ having the same size as the weft yarns t in the portion 12. The second weft plane is made up of three layers of weft yarn $t_2$ of size greater than that of the yarns t, for example twice the size of the yarns $t_1$, and on either side of these three layers, two layers of weft yarns $t_1$. The following weft planes in the portion 14 are formed by weft yarns $t_2$. It is possible to adopt a transition that is more progressive, possibly by using weft yarns that present a size that is intermediate between the sizes of the yarns $t_1$ and $t_2$.

In the description above, the thickness of the fiber structure is varied in the warp direction.

The invention is equally applicable to making a fiber structure having thickness that varies in the weft direction.

Figure 8:
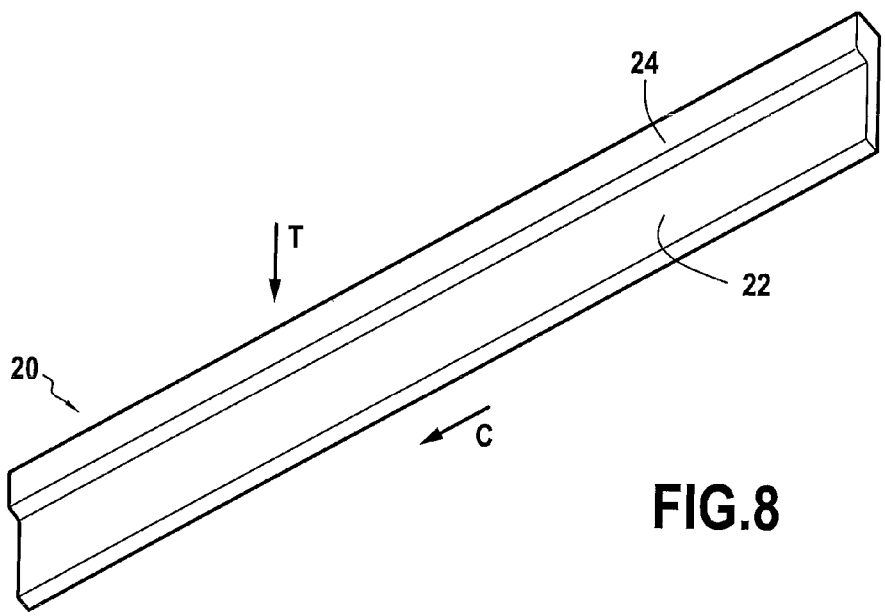
FIG. 8 is a highly diagrammatic view in perspective of another 3D woven fiber structure of varying thickness suitable for being made by a method of the invention.

FIG. 8 shows very diagrammatically one such 3D woven fiber structure 20 having a portion 22 and a portion 24 presenting, in the weft direction, different thicknesses in a direction that is perpendicular to the warp direction C and to the weft direction T.

In the thicker weave 24, the number of layers of warp yarns is greater than the number of layers of warp yarns in the thinner portion 22.

The transition between the portion 22 and the portion 24 is made by decreasing the number of weft planes while increasing the number of layers of weft yarns in a manner similar to that described above by way of example for varying thickness in the warp direction. There is therefore no need for a detailed description.

In addition, in order to avoid too sudden a variation in the overall density of the fiber structure between the portions 22 and 24, the size and/or the structure of the warp yarns in the portion 24 may be selected so as to be greater than the size and/or structure of the warp yarns in the portion 22.

Naturally, it is possible to arrange a plurality of thickness variations in the weft direction, with a reduction in thickness being obtained by a process that is the inverse of that for increasing thickness.

The invention claimed is:

1. A method of making a fiber structure by multilayer three-dimensional weaving, comprising increasing a thickness of the fiber structure in a direction perpendicular to warp and weft directions during a transition in the warp direction from a first portion of the fiber structure to a second portion of the fiber structure having a thickness that is greater than the thickness of the first portion, said thickness increasing including increasing a number of layers of warp yarns and decreasing a number of warp planes by constituting at least one warp plane in the second portion with warp yarns taken from at least two different warp planes in the first portion, said at least two different warp planes lying one behind the other in the weft direction, while conserving the same number of woven warp yarns along the warp direction.

2. A method of making a fiber structure by multilayer three-dimensional weaving, comprising decreasing a thickness of the fiber structure in a direction perpendicular to warp and weft directions during a transition in the warp direction from a second portion of the fiber structure to a first portion of the fiber structure having a thickness that is smaller than the thickness of the second portion, said thickness decreasing including decreasing a number of layers of warp yarns and increasing a number of warp planes by sharing the warp yarns of at least one warp plane of the second portion between at least two different warp planes of the first portion, said at least two different warp planes lying one behind the other in the weft direction, while conserving the same number of woven warp yarns along the warp direction.

3. A method according to claim 1 or claim 2, wherein for weaving in the second portion, weft yarns are used, at least some of which present a size and/or a structure that is/are greater than the size and/or structure of the weft yarns used for weaving in the first portion.

4. A method according to claim 3, wherein a transition between said two portions of the fiber structure is made by progressively varying the overall size of the weft yarns in successive weft planes.

5. A method according to claim 1 or claim 2, wherein a warp plane of the second portion contains all of the warp yarns of two adjacent warp planes of the first portion.

6. A method according to claim 1 or claim 2, cent warp planes of the first portion.

7. A method of making a fiber structure by multilayer three-dimensional weaving, comprising increasing a thickness of the fiber structure in a direction perpendicular to warp and weft directions during a transition in the weft direction from a first portion of the fiber structure to a second portion of the fiber structure having a thickness that is greater than the thickness of the first portion, said thickness increasing including increasing a number of layers of weft yarns and decreasing a number of weft planes by constituting at least one weft plane in the second portion with weft yarns taken from at least two different weft planes in the first portion, said at least two different weft planes lying one behind the other in the warp direction, while conserving the same number of woven weft yarns along the weft direction.

8. A method of making a fiber structure by multilayer three-dimensional weaving, comprising decreasing a thickness of the fiber structure in a direction perpendicular to the warp and weft directions during a transition in the weft direction from a second portion of the fiber structure to a first portion of the fiber structure having a thickness that is smaller than the thickness of the second portion, said thickness decreasing including decreasing a number of layers of weft yarns yarns and increasing a number of weft planes by sharing the weft yarns of at least one weft plane in the second portion between at least two different weft planes of the first portion, said at least two different weft planes lying one behind the other in the warp direction, while conserving the same number of woven weft yarns along the weft direction.

9. A method according to claim 7 or claim 8, wherein for weaving in the second portion, warp yarns are used, at least some of which present a size and/or a structure that is/are greater than the size and/or structure of the warp yarns used for weaving in the first portion.

10. A method according to claim 9, wherein a transition between said two portions of the fiber structure is made by progressively varying the overall size of the warp yarns in successive warp planes.

11. A method according to claim 7 or claim 8, wherein a weft plane of the second portion contains all of the weft yarns of two adjacent weft planes of the first portion.

12. A method according to claim 7 or claim 8, wherein two adjacent weft planes of the second portion comprise the weft yarns of three adjacent weft planes of the first portion.

\* \* \* \* \*